US009619500B2

(12) United States Patent
Asaad et al.

(10) Patent No.: US 9,619,500 B2
(45) Date of Patent: *Apr. 11, 2017

(54) HARDWARE IMPLEMENTATION OF A TOURNAMENT TREE SORT ALGORITHM

(71) Applicant: International Business Machines Corporation, Armonk, NY (US)

(72) Inventors: Sameh W. Asaad, Briarcliff Manor, NY (US); Hong Min, Poughkeepsie, NY (US); Bharat Sukhwani, Briarcliff Manor, NY (US); Mathew S. Thoennes, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 262 days.

This patent is subject to a terminal disclaimer.

(21) Appl. No.: 14/018,647

(22) Filed: Sep. 5, 2013

(65) Prior Publication Data

US 2015/0046475 A1 Feb. 12, 2015

Related U.S. Application Data

(63) Continuation of application No. 13/961,092, filed on Aug. 7, 2013.

(51) Int. Cl.
  *G06F 17/30* (2006.01)
  *G06F 7/24* (2006.01)
(52) U.S. Cl.
  CPC ......... *G06F 17/30327* (2013.01); *G06F 7/24* (2013.01)
(58) Field of Classification Search
  CPC . G06F 17/30312; G06F 17/30327; G06F 7/24
  See application file for complete search history.

(56) References Cited

U.S. PATENT DOCUMENTS

| 738,247 A | 9/1903 | Schoof | |
| 5,210,870 A * | 5/1993 | Baum | G06F 15/78 340/146.2 |

(Continued)

FOREIGN PATENT DOCUMENTS

| EP | 2182448 A1 | 5/2010 |
| WO | 9954833 A2 | 10/1999 |

(Continued)

OTHER PUBLICATIONS

CSE 326 Data Structures, "Pointers", Jan. 19, 2005, pp. 1-6.*

(Continued)

*Primary Examiner* — Etienne Leroux
*Assistant Examiner* — Jared Bibbee
(74) *Attorney, Agent, or Firm* — Cantor Colburn LLP; Mercedes Hobson

(57) ABSTRACT

Embodiments include methods, systems and computer program products for performing a tournament tree sort on a hardware accelerator. The method includes receiving a plurality of key values by the hardware accelerator, storing each the plurality of keys into a location on a memory of the hardware accelerator, and creating a pointer to each of the locations of the plurality of keys. The method also includes storing the pointer to each of the plurality of keys into a first array stored by the hardware accelerator, sorting the plurality of keys by ordering the pointers in the first array and by using a second array for storing the pointers, wherein the sorting identifies a winning key from the plurality of keys in the memory, and outputting the winning key.

16 Claims, 6 Drawing Sheets

(56) References Cited

U.S. PATENT DOCUMENTS

| | | | |
|---|---|---|---|
| 5,274,805 A | | 12/1993 | Ferguson et al. |
| 5,287,494 A | * | 2/1994 | Garcia ................. G06F 7/24 |
| | | | 340/2.81 |
| 5,355,478 A | * | 10/1994 | Brady .................. G06F 7/24 |
| 5,579,514 A | | 11/1996 | Turek et al. |
| 5,619,693 A | * | 4/1997 | Troisi .................. G06F 7/24 |
| 5,619,713 A | | 4/1997 | Baum et al. |
| 6,282,541 B1 | * | 8/2001 | Hoa ............. G06F 17/30489 |
| 6,330,559 B1 | * | 12/2001 | Azuma ................. G06F 7/36 |
| 6,385,612 B1 | | 5/2002 | Troisi |
| 6,748,386 B1 | | 6/2004 | Li |
| 6,891,834 B1 | | 5/2005 | Dally et al. |
| 8,135,747 B2 | | 3/2012 | Anzalone et al. |
| 8,185,867 B2 | | 5/2012 | Robinson |
| 8,244,718 B2 | | 8/2012 | Chamdani et al. |
| 8,261,020 B2 | | 9/2012 | Krishnaprasad et al. |
| 8,321,476 B2 | | 11/2012 | Kirk et al. |
| 8,392,463 B2 | | 3/2013 | Gautam et al. |
| 8,645,623 B1 | | 2/2014 | O'Shea et al. |
| 8,688,683 B2 | | 4/2014 | Simon et al. |
| 2002/0078023 A1 | | 6/2002 | Lawton |
| 2003/0018630 A1 | | 1/2003 | Indeck et al. |
| 2003/0212668 A1 | | 11/2003 | Hinshaw et al. |
| 2006/0224563 A1 | | 10/2006 | Hanson et al. |
| 2007/0005925 A1 | | 1/2007 | Burkley et al. |
| 2007/0169059 A1 | | 7/2007 | Halambi et al. |
| 2007/0277036 A1 | | 11/2007 | Chamberlain et al. |
| 2008/0183688 A1 | | 7/2008 | Chamdani et al. |
| 2008/0189252 A1 | * | 8/2008 | Branscome ....... G06F 17/30442 |
| 2008/0250011 A1 | | 10/2008 | Haubold et al. |
| 2009/0106194 A1 | * | 4/2009 | Furusho ............ G06F 17/30961 |
| 2009/0132638 A1 | | 5/2009 | Kim et al. |
| 2009/0313436 A1 | | 12/2009 | Krishnaprasad et al. |
| 2010/0005077 A1 | | 1/2010 | Krishnamurthy et al. |
| 2010/0042624 A1 | * | 2/2010 | Min ................. G06F 17/30607 |
| 2010/0185954 A1 | | 7/2010 | Simernitski et al. |
| 2010/0293338 A1 | | 11/2010 | Krishnaprasad et al. |
| 2011/0167056 A1 | | 7/2011 | Khanolkar et al. |
| 2012/0017126 A1 | | 1/2012 | Yamano |
| 2012/0047126 A1 | | 2/2012 | Branscome et al. |
| 2012/0124055 A1 | | 5/2012 | Deubel et al. |
| 2012/0124070 A1 | | 5/2012 | Mishra et al. |
| 2012/0136875 A1 | | 5/2012 | Pan et al. |
| 2012/0246156 A1 | | 9/2012 | Gupta et al. |
| 2012/0246170 A1 | | 9/2012 | Iantorno |
| 2012/0278339 A1 | | 11/2012 | Wang |
| 2013/0054942 A1 | | 2/2013 | Serrano |
| 2013/0282687 A1 | | 10/2013 | Ah-Pine et al. |
| 2014/0351239 A1 | | 11/2014 | Davis et al. |
| 2015/0046453 A1 | | 2/2015 | Asaad et al. |
| 2016/0110390 A1 | | 4/2016 | Asaad et al. |
| 2016/0110395 A1 | | 4/2016 | Asaad et al. |

FOREIGN PATENT DOCUMENTS

| | | |
|---|---|---|
| WO | 2007061430 A1 | 5/2007 |
| WO | 2007143198 A2 | 12/2007 |
| WO | 2012024585 A1 | 2/2012 |
| WO | 2013055812 A1 | 4/2013 |

OTHER PUBLICATIONS

Michael Stack, "The Theory Behind the z/Architecture Sort Assist Instructions", Aug. 10, 2008, pp. 1-100.*
Cheng et al., "An Efficient Hybrid Join Algorithm: A DB2 Prototype", Data Base Technology Institute, IBM Santa Teresa Laboratory, San Jose, CA 95161, USA, 1991 IEEE, pp. 171-180.
Geambasu et al., "Vanish: Increasing Data Privacy with Self-Destructing Data", 18th USENIX Security Symposium; 52 pgs.
Hey et al., "Cyberinfrastructure for e-Science", Science 308, 817 (2005); cover page and pp. 817-821.
Jenson, Jonas Julian "Reconfigurable FPGA Accelerator for Databases," Master Thesis, University of Oslo Department of Informatics; Aug. 1, 2012; 107 pgs.
Kumar et al., "Improved Algorithms and Data Structures for Solving Graph Problems in External Memory", Department of EECS, Northwestern university, Evanston, IL 60208, 1996 IEEE, pp. 169-176.
Ledjfors, Calle "High-Level GPU Programming Domain-specific optimization and inference", Doctoral dissertation, 2008, Department of Computer Science Lund University; 120 pgs.
Levitt et al., "An Image Understanding Environment for DARPA Supported Research and Applications, First Annual Report" Advanced Decision Systems Mountain View, CA 1991, 80 pgs.
Pawlowski, et al., "Parallel Sorting of Large Data Volumes on Distributed Memory Multiprocessors", Parallel Computer Architectures, Springer Berlin Heidelberg, 1993, 246-264, 19 pgs.
Rahkila, P., "Grain—A Java Data Analysis System for Total Data Readout", Nuclear Instruments and Methods in Physics Research Section A: Accelerators, Spectrometers, Detectors and Associated Equipment 595.3 (2008): 637-642; 13 pgs.
Singh et al., "Introduction to the IBM Netezza Warehouse Appliance," Proceedings CASCON '11 Proceedings fo the 2001 conference of the Center for Advanced Studies on Collaborative Research; pp. 385-386.
Stonebraker, Michael R., "Architectural Options for Object-Relational DBMSs", White Paper (1997), 16 pgs.
Sukhwani, et al., "Database Analytics Acceleration using FPGAs," PACT '12 Proceedings of the 21st International Conference on Parallel Architectures and Compilation Techniques; pp. 411-420.
Vaidya et al., "A Novel Multicontext Coarse-Grained Join Accelerator for Column-Oriented Databases," International Conference on Engineering of Reconfigurable Systems and Algorithms (ERSA), 2009; 7 pgs.
Yagi et al., "GMM Foreground Segmentation Processor Based on Address Free Pixel Streams", Acoustics, Speech and Signal Processing (ICASSP), 2012 IEEE International Conference on IEEE, 2012, pp. 1653-1656.
Gosink et al., "Query-Driven Visualization of Time-Varying Adaptive Mesh Refinement Data", IEEE Transactions on Visualization and Computer Graphics, vol. 14, No. 6, Nov./Dec. 2008; pp. 1715-1722.
Sukhwani et al., "Database Analytics Acceleration using FPGAs", PACT' 12, Sep. 19-23, 2012; Minneapolis, Minnesota, USA; Copyright 2012 ACM, 10 pgs.
Xu et al., "Query decomposition based on ontology mapping in data integration system", Third International Conference on Natural Computation (ICNC 2007), 2007 IEEE; pp. 1-5.
U.S. Appl. No. 13/961,089; filed Aug. 7, 2013.
U.S. Appl. No. 13/961,092; filed Sep. 7, 2013.
U.S. Appl. No. 14/018,646; filed Sep. 5, 2013.
U.S. Appl. No. 12/246,751; filed Oct. 7, 2008.
U.S. Appl. No. 13/961,094; filed Aug. 7, 2013.
U.S. Appl. No. 13/961,095; filed Aug. 7, 2014.
U.S. Appl. No. 14/018,650; filed Sep. 5, 2013.
U.S. Appl. No. 14/018,651; filed Sep. 5, 2013.
U.S. Appl. No. 14/328,933; filed Jul. 11, 2014.
U.S. Appl. No. 14/583,999; filed Dec. 29, 2014.
U.S. Appl. No. 14/741,490; filed Jun. 17, 2015.
Iyer, Balakrishna R. "Hardware Assisted Sorting in IBM's DB2 DBMS", International Conference on Management of Data, COMAD 2005b, Dec. 20-22,2005, Computer Society of India, 2005; 9 pgs.
Stack, Michael, "The Theory Behind the z/Architecture Sort Assist Instructions", Neon Enterprise Software, Inc., SHARE in San Jose—Aug. 10-15, 2008, Session 8121; 100 pgs.
Sukhwani et al., "A Hardware/Software Approach for Database Query Acceleration with FPGAs", Int. J. Parallel Prog., Published online: Oct. 28, 2014; Springer; pp. 1-31.
z/Architecture: "Principles of Operation"; Tenth Edition, Sep., 2012; Publication No. SA22-7832-09; copyright IBM Corp.; 1990-2012; p. 1-1568.

(56) References Cited

OTHER PUBLICATIONS

U.S. Appl. No. 14/741,490; filed Jun. 17, 2015; "Hardware Implementation of a Tournament Tree Sort Algorithm Using an External Memory".

* cited by examiner

| 2 stage comparator | | | | |
|---|---|---|---|---|
| T0 | T1 | T2 | T3 | T4 |
| N, P1 | | N | | |
| | N, P2 | (N, P2) | P2 | |
| | P1, P2 | | P1 | |
| | | N, P3 | | N |
| | | P2, P3 | (P2, P3) | P3 |

HARDWARE IMPLEMENTATION OF A TOURNAMENT TREE SORT ALGORITHM

This application is a continuation application of the legally related U.S. Ser. No. 13/961,092 filed Aug. 7, 2013, the contents of which are incorporated by reference herein in their entirety.

BACKGROUND

The present invention relates to a hardware implementation of sorting algorithms, and more specifically, to an efficient hardware implementation of a tournament tree sort algorithm.

Sorting is generally acknowledged to be one of the most time-consuming computer-implemented procedures. It has been estimated that over twenty-five percent of all computer running time is devoted to sorting. In fact, many computing systems use over half of their available computer time for sorting. Numerous proposals and improvements have been disclosed in the art for the purposes of reducing sorting time and increasing sorting efficiency. There are a variety of sorting algorithms that are currently being used, one of which is called a tournament tree sort.

In general, a tournament tree sort is a binary-tree based selection and replacement sort algorithm. Tournament tree sort algorithms allow sorting of keys in a continuous streaming fashion. Incoming keys are entered into the leaf nodes and the keys exit, in sorted order, from the tree's root node. For a set of input records that are initially populated into the leaf nodes, pair-wise comparisons are performed at each tree level until a winning record emerges at the tree root. After the initial round of comparison and population, each non-leaf node holds exactly one input key, except the winning key which is sent out of the tree. During a continuous sort, after a winner is removed from the tree, a new input record is inserted at the previous winner's leaf node and is compared (and swapped, if needed) with exactly one non-leaf node at each level, until the tree root is reached and the new winner is determined.

SUMMARY

According to an embodiment, a method for performing a tournament tree sort on a hardware accelerator includes receiving a plurality of key values by the hardware accelerator, storing each the plurality of keys into a location on a memory of the hardware accelerator, and creating a pointer to each of the locations of the plurality of keys. The method also includes storing the pointer to each of the plurality of keys into a first array stored by the hardware accelerator, sorting the plurality of keys by ordering the pointers in the first array and by using a second array for storing the pointers, wherein the sorting identifies a winning key from the plurality of keys in the memory, and outputting the winning key.

According to another embodiment, a hardware accelerator for performing a tournament tree sort includes a memory configured to store each of a plurality of key values, a first array configured to store pointers to locations of each of the plurality of key values, and a second array configured to store pointers to location of a quarter or less of the plurality of key values. The hardware accelerator also includes a processor configured to sort the plurality of key values by ordering the pointers in the first array and the second array for storing the pointers, wherein the sorting identifies a winning key from the plurality of keys in the memory.

According to another embodiment, a computer program product including a non-transitory computer readable storage medium having computer readable program code stored thereon that, when executed, performs a method. The method includes receiving a plurality of key values by the hardware accelerator, storing each the plurality of keys into a location on a memory of the hardware accelerator, and creating a pointer to each of the locations of the plurality of keys. The method also includes storing the pointer to each of the plurality of keys into a first array stored by the hardware accelerator, sorting the plurality of keys by ordering the pointers in the first array and by using a second array for storing the pointers, wherein the sorting identifies a winning key from the plurality of keys in the memory, and outputting the winning key.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 4C depicts a table showing the results of a two-stage comparison of the internal nodes of the tournament tree of FIG. 4A in accordance with an exemplary embodiment.

DETAILED DESCRIPTION

Embodiments disclosed herein include a tournament tree sort algorithm implemented in a hardware device, such as an accelerator. In exemplary embodiments, the tournament tree sort algorithm is configured to begin a second sorted run of a tournament tree sort without flushing or draining the tournament tree from a prior sorting run by appending a color value to each key in the tournament tree. In addition, the accelerator is configured to efficiently store a pointer structure for the tournament tree sort. In exemplary embodiments, the tournament tree sort algorithm is configured to perform a speculative comparison of the nodes in the tournament tree, which allows for the output of a sorted key every log N cycles, where N is the number of leaf nodes in the tree.

Figure 1:
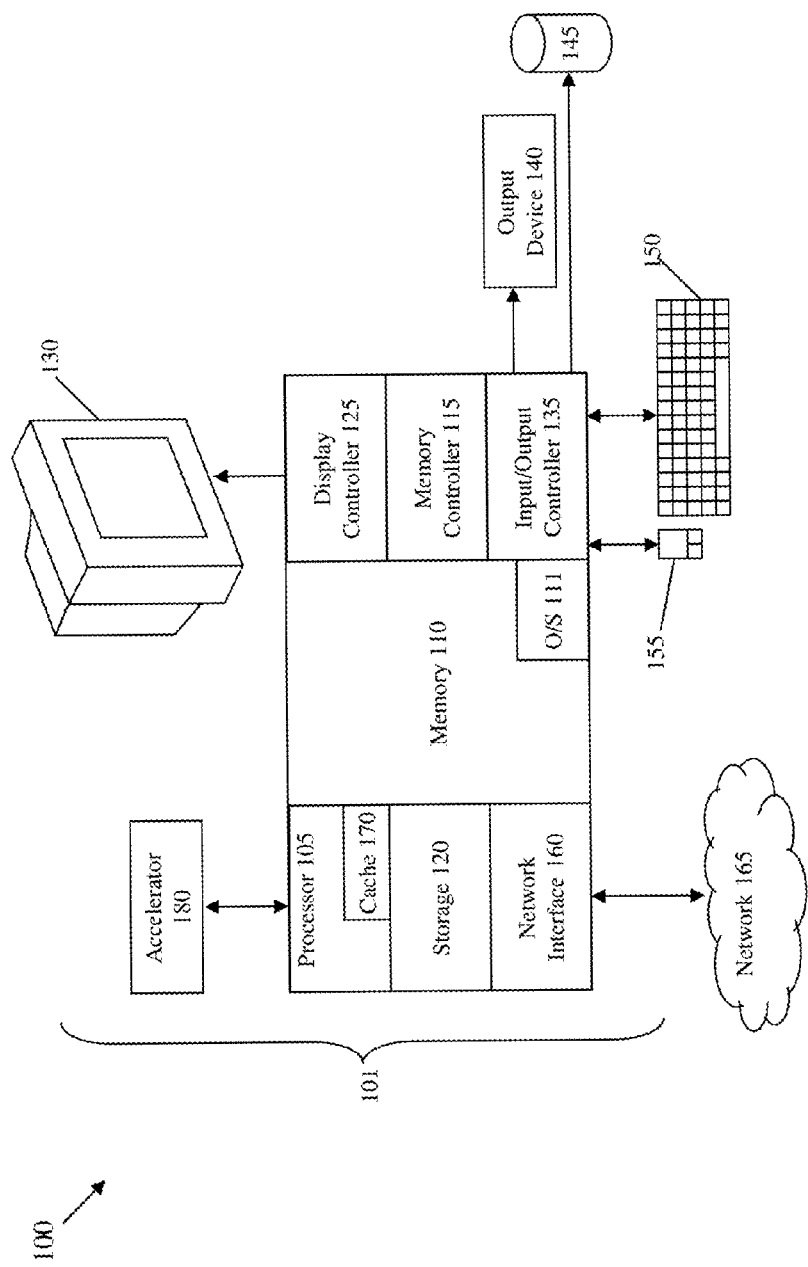
FIG. 1 depicts a block diagram of a computer system for practicing the teachings herein according to an exemplary embodiment.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. In exemplary embodiments, the computer system 100 includes one or more accelerators 180 that are configured to communicate with the processor 105. The accelerator 180 may be a field programmable gate array (FPGA), an application-specific integrated circuit (ASIC), or other suitable device that is configured to perform specific processing tasks. In exemplary embodiments, the computer system 100 may be configured to offload certain processing tasks to an accelerator 180 because the accelerator 180 can perform the processing tasks more efficiently than the processor 105.

A tournament tree algorithm allows continuous sorting of streaming input keys. Tournament trees with N leaf nodes guarantees a minimum sorted run of size N, although much larger sorted runs can usually be achieved, with typical run sizes being 2N. For example, in the case of data that is almost sorted, which happens frequently in databases, a tournament tree can continuously sort the inputs with no limit on the maximum size of sorted output. For each new key inserted into the tree, the tournament tree algorithm requires only one comparison at each of the log(N) levels of the tree, since the comparisons are made along a known path to the root. This characteristic allows the entire tree to be served with a single comparator, with a throughput of 1 key per log(N) cycles.

In general, the implementation of a tournament tree sort includes four phases from the beginning to the end of a sorting run. The first phase, referred to as the initial insertion phase, includes the initial insertion of keys into the tournament tree, which populates the leaf nodes of the tournament tree. Since the keys are inserted serially and all the comparisons are made using a single comparator, evaluating the comparisons for all the levels of the tournament tree during the insertion phase can require complex scheduling and bookkeeping logic. In exemplary embodiments, the complexity can be reduced by evaluating only the first level of comparison in the tournament tree during the initial insertion phase. This eliminates the need to work out the order of comparisons in a partially filled tree.

The second phase, referred to as the evaluation phase, of implementing a tournament tree sort includes evaluating the remaining levels of the tournament tree and performing sorting after the leaf nodes are fully populated. The evaluation phase adds to the cost of sorting the tournament tree after the last key from the initial set of keys is inserted. In an exemplary embodiment, it takes approximately four thousand comparisons to fully evaluate a sixteen thousand node tournament tree once the keys are populated. Since all the keys are available at this time and since the comparisons are being done across one level of the tree at a time, this process can be easily pipelined, with one comparison being performed every cycle. In one embodiment, the evaluation phase only adds about one percent overhead for sorting sixteen thousand rows given a single cycle for comparison in a node. For sort run sizes larger than the tree size, which is typical, this overhead can be further reduced.

The third phase of implementing a tournament tree sort is the continuous sorting phase. During the continuous sorting phase incoming new keys are inserted into the leaf node of the previous winner and are walked up the tree following the path of the previous winner. At each level, the value of the new key is compared with the value at the internal node and either the current winner is kept or the key is swapped at that node. In exemplary embodiments, each new key that is inserted results in the next sorted key being emitted from the tree.

The fourth and final phase of implementing a tournament tree sort is the flush phase, which occurs when no more keys to be sorted are added to the tree. In exemplary embodiments, the flush phase includes inserting dummy keys, which are guaranteed to be the smallest/largest possible key, into the tree and flushing the remaining valid keys. Since the dummy keys are the smallest/largest possible key, they always lose in the comparisons and thus do not emerge as winners until all the remaining valid keys have been flushed from the tree. At this point, all the valid keys have been sorted and the sort operation is complete.

Figure 2A:
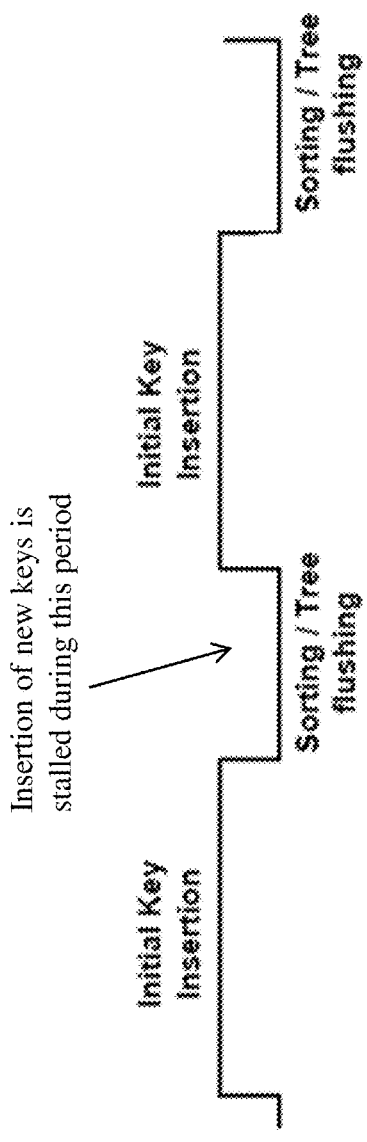
FIG. 2A depicts a timing diagram for performing consecutive tournament tree sort runs.

In an exemplary embodiment of a tournament tree sort algorithm implemented efficiently in hardware, the tournament tree sort algorithm is to be able to handle the incoming keys that violate the order of the current sorting run. In other words, the algorithm is configured to insert keys during the continuous sorting phase that have values that are greater or lesser, depending on the sort direction, than the last value emitted from the tournament tree. In tournament tree sorts, such keys cannot participate in the current sort run since it would violate the monotonically decreasing/increasing order of the values in the current sorted run. One approach currently used to ensure that the order of the sorted run is not violated is to complete the current run by flushing the tournament tree before starting the next sorted run. A timing diagram illustrating this approach is shown in FIG. 2A. As illustrated, each sorting run includes insertion of new keys, sorting and flushing of the tournament tree and each sorting run must be completed before a second sorting run can begin. This approach incurs extra cost associated with the setup and teardown of a tournament tree every time a sort run needs to be completed.

Figure 2B:
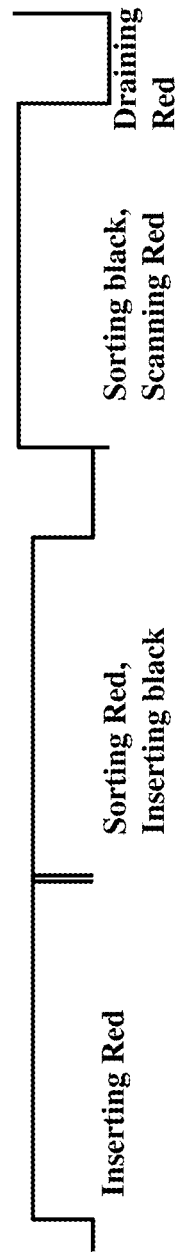
FIG. 2B depicts a timing diagram for performing consecutive tournament tree sort run with the use of a color value for each tree sort run according to an exemplary embodiment.

In exemplary embodiments, the tournament tree sort algorithm is configured to allow continuous sorting of keys even in the presence of keys that violate the sort order. In one embodiment, each key is provided with a color, or run generation indicator, which is affixed to the key and allows the key to participate in the tournament tree without corrupting the current sorted run. A timing diagram illustrating this approach is shown in FIG. 2B. As illustrated, each sorting run includes insertion of new keys, sorting and flushing of the tournament tree. In exemplary embodiments, a subsequent sorting run can begin before the completion of a prior sorting. In addition, several sorted runs can be completed before there is a need to flush the tournament tree. As illustrated, the keys of a second sorting run can be inserted into the tree during the sorting and flushing phase of the first sorting run.

Figure 3:
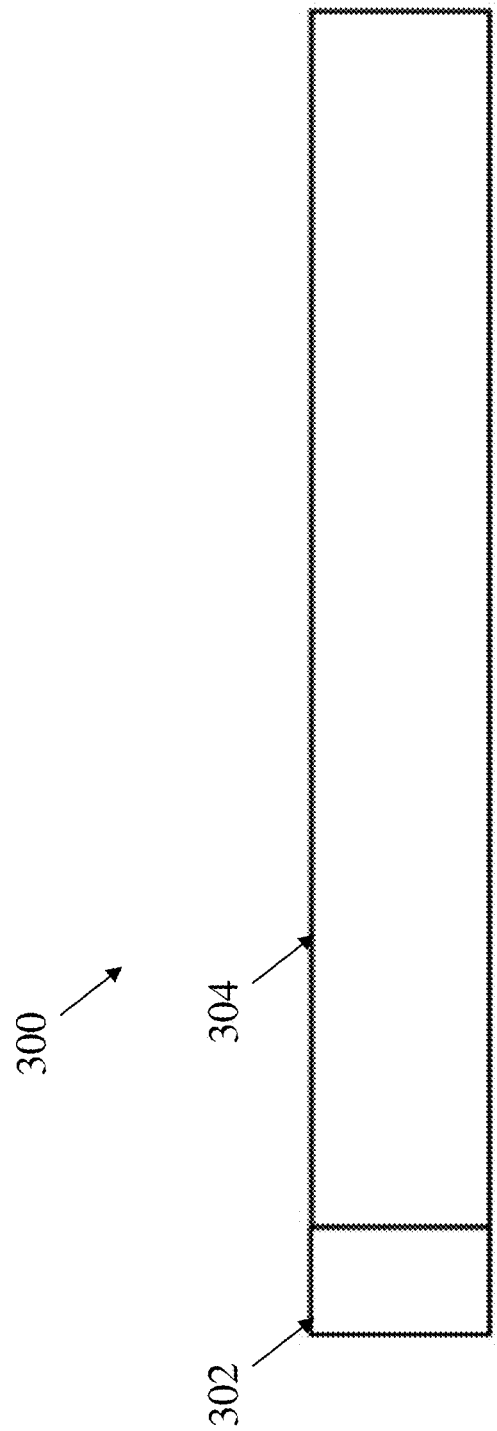
FIG. 3 depicts a block diagram of a key having a color value according to an exemplary embodiment.

Referring now to FIG. 3, a block diagram of a key 300 having a color 302 that is affixed to a key value 304 is shown. In exemplary embodiments, the color 302 indicates the generation of the tournament tree sort run and allows the key 300 to participate in the tournament tree without corrupting the current sorted run. In one embodiment, the color 302 may be a three bit value that is inserted in the front of a key value 304. In exemplary embodiments, a three bit color 302 value can be used to identify seven separate tournament tree sort runs. In exemplary embodiments, the lowest, or highest if ascending, color value 302 may be reserved to act as a dummy key to flush the tree at the end of all the runs.

In one embodiment, for a descending tournament tree sort, the color value for keys in the first tournament tree sort run is set to the maximum color value. In another embodiment, for an ascending tournament tree sort, the color value for keys in the first tournament tree sort run is set to the minimum color value. In exemplary embodiments, during insertion of a key into the tournament tree, the value of each new key is checked against the value of the last key emitted from the tournament tree. For a key that would not violate the order of the current run, the value of the color append to the key would be the current color of the tournament tree sort run. For a key that would violate the order of the current run, the value of the color append to the key would be one less than the current color value in descending sorts and one more than the current color value in ascending sorts. In descending sorts, with the lower color value appended to the front of the key, the new key will always be smaller than the keys in the color of the current run and will never be a winner in the current run. It can thus participate in the tree without corrupting the current sorted run. In ascending sorts, with the higher color value appended to the front of the key, the new key will always be larger than the keys in the color of the current run and can participate in the tree without corrupting the current sorted run.

In exemplary embodiments, the use of the color, or run generation indicator, eliminates the need to flush the tournament tree between sorted runs, which provides significant time savings. For example, flushing a sixteen thousand node tree would otherwise require inserting sixteen thousand extra dummy keys, potentially doubling the sorting time for each run. With the coloring scheme, flushing is required only once after all the sorted runs have been generated and there are no more keys to be sorted.

In exemplary embodiments, a tournament tree sort algorithm implemented in hardware is configured to efficiently store the internal nodes, or pointers, of the tournament tree. To support large sorted runs with very long sort keys exemplary embodiments utilize on-chip memory and block RAM. In a tournament tree sort of a tree with N leaf nodes, storage is required for N loser pointers in the tree, N/2 winner pointers (for further comparisons) and for an amount N/4 of secondary storage (for alternating while evaluating subsequent levels). These can result in significant memory requirements for large values of N. In exemplary embodiments, the top half of the loser pointer array is reused to store the first level of winners and the top half of the secondary storage for alternating, thus obviating the need for the N/2 array. Accordingly, the required storage for storing internal nodes used by the tournament tree sort algorithm can be reduced by approximately twenty-nine percent.

Figure 4A:
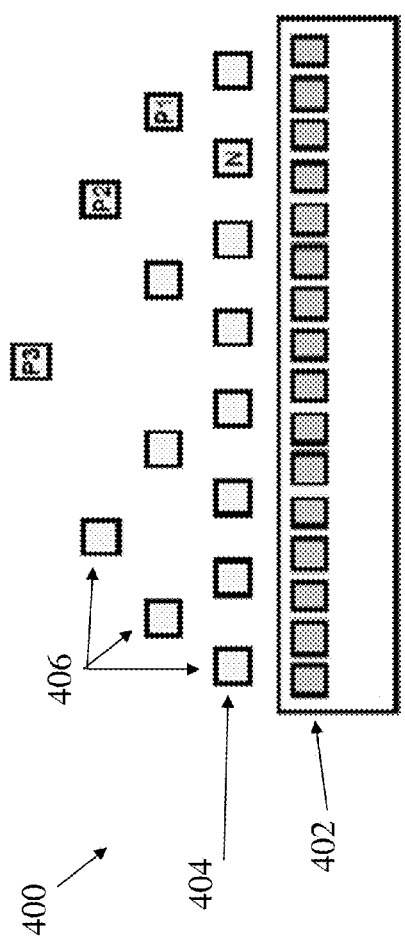
FIG. 4A depicts a block diagram of a tournament tree having sixteen leaf nodes in accordance with an exemplary embodiment.
Figure 4B:
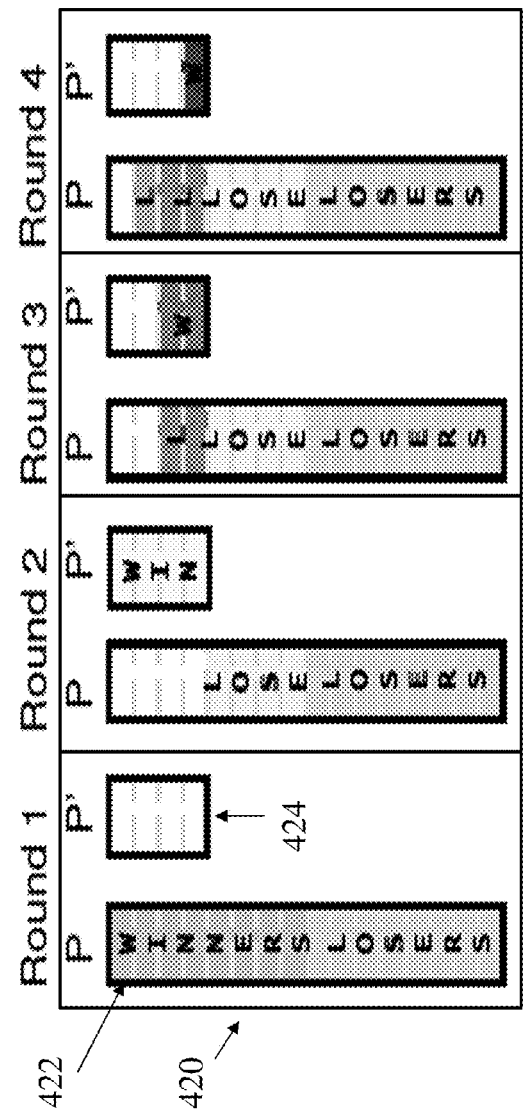
FIG. 4B depicts a block diagram of a memory structure for storing the internal nodes of the tournament tree of FIG. 4A in accordance with an exemplary embodiment.

Referring now to FIG. 4A, a block diagram of a tournament tree 400 having sixteen nodes in accordance with an exemplary embodiment is shown. As will be understood by those of ordinary skill in the art, the tournament tree illustrated is merely exemplary and the number of nodes used in the tournament tree may be much larger. For example, one implementation of the tournament tree may include approximately 16,000 leaf nodes. In exemplary embodiments, the tournament tree 400 has leaf nodes 404 that are stored in key RAM 402. In addition, the tournament tree 400 includes a plurality of internal nodes 406 that are pointers to the locations in the key RAM 402 corresponding to one of the leaf nodes 404. FIG. 4B illustrates a block diagram of a memory structure 420 for storing the internal nodes 406 of the tournament tree 400 in FIG. 4A in accordance with an exemplary embodiment. In exemplary embodiments, the memory structure 420 includes a first array 422 and a second array 424, which are both used to store pointers corresponding to nodes of the tournament tree 400.

In exemplary embodiments, as keys 404 are inserted into the key RAM 402, the loser and winner for the first rank of the tournament tree 400 for those leaf nodes 404 are calculated. Pointers to the locations in the key RAM 402 of the winning and losing keys are then inserted into the first array 422 with the loser placed in a stack starting at the last position in the first array 422 and the winner in a stack starting in the middle of the first array 422. Once all the keys 404 have been inserted into the key RAM 402, the contents of the first array 422 are shown as round 1. The next level of the tournament tree 400 is calculated by walking from the bottom of the winner section of the first array 422, comparing the keys 402 referenced by the pointers pair-wise from bottom to top. The loser is placed on a stack starting at the middle of first array 422 and the winner in a stack starting at the bottom of second array 424. In exemplary embodiments, the space in first array 422 starting at the middle of the array can be reused for the loser because the current data has already been consumed. In contrast, the upper quarter of first array 422 cannot be reused without corrupting the pointers to the data being sorted. After all the winners in first array 422 have been examined, the contents of the arrays 422 and 424 are shown as round 2. The process is repeated for the winners in second array 424 twice more, resulting in the results shown as in rounds 3 and 4.

In exemplary embodiments, the nodes in the tree can now be accessed in first array 422 through an arithmetic operation on the index of the current position, yielding the index of the parent node of the current node being examined. As a new key gets inserted at the position of the last winner, it is walked up the tree by comparing it against the current loser at each level and updating the loser first array 422 as needed.

In tournament tree sorts, once the tree is fully populated, for each new key being inserted, the comparison at each tree level is dependent on the outcome of the comparison at the previous level and hence these comparisons cannot be pipelined. A single cycle operation is required to ensure that the tree can accept a key every log(N) cycles and maintain the target throughput. For small keys, even a purely combinational comparator can provide high operating frequency and low cycle time. However, obtaining high operational frequency with large comparators (for large keys) requires breaking up the comparator operation into multiple stages. For example, comparing two forty-byte keys using purely combinational logic will results in a large cycle time.

In exemplary embodiments, a two-stage comparator is provided that performs speculative comparisons allowing the process to be pipelined. This, however, takes two cycles to complete a comparison operation. The next key comparison, which depends on the result of this current comparison, can thus only be performed after two cycles. Thus a new key comparison can only be performed every two cycles. To alleviate this, in exemplary embodiments, at each tree level, two comparisons are performed in parallel, one with each of the two inputs of the comparison at the previous level. The result of one of these comparisons is then chosen based on the outcome of the comparison at the previous level. This allows for one new key comparison to be performed every cycle. FIG. 4C illustrates a table 450 showing the results of a two-stage comparison of the internal nodes of the tournament tree of FIG. 4A in accordance with an exemplary embodiment. As shown, at time T1 the key values associated with nodes N and P1 are compared. Next, at time T1, the key values associated with nodes N and P2 are compared and the key values associated with nodes P1 and P2 are compared. Next, as shown at T2, N is output as the winner of the previous comparison of the key values associated with nodes N and P2. Also at time T2, the key values associated with nodes N and P3 are compared and the key values associated with nodes P2 and P3 are compared.

Figure 5:
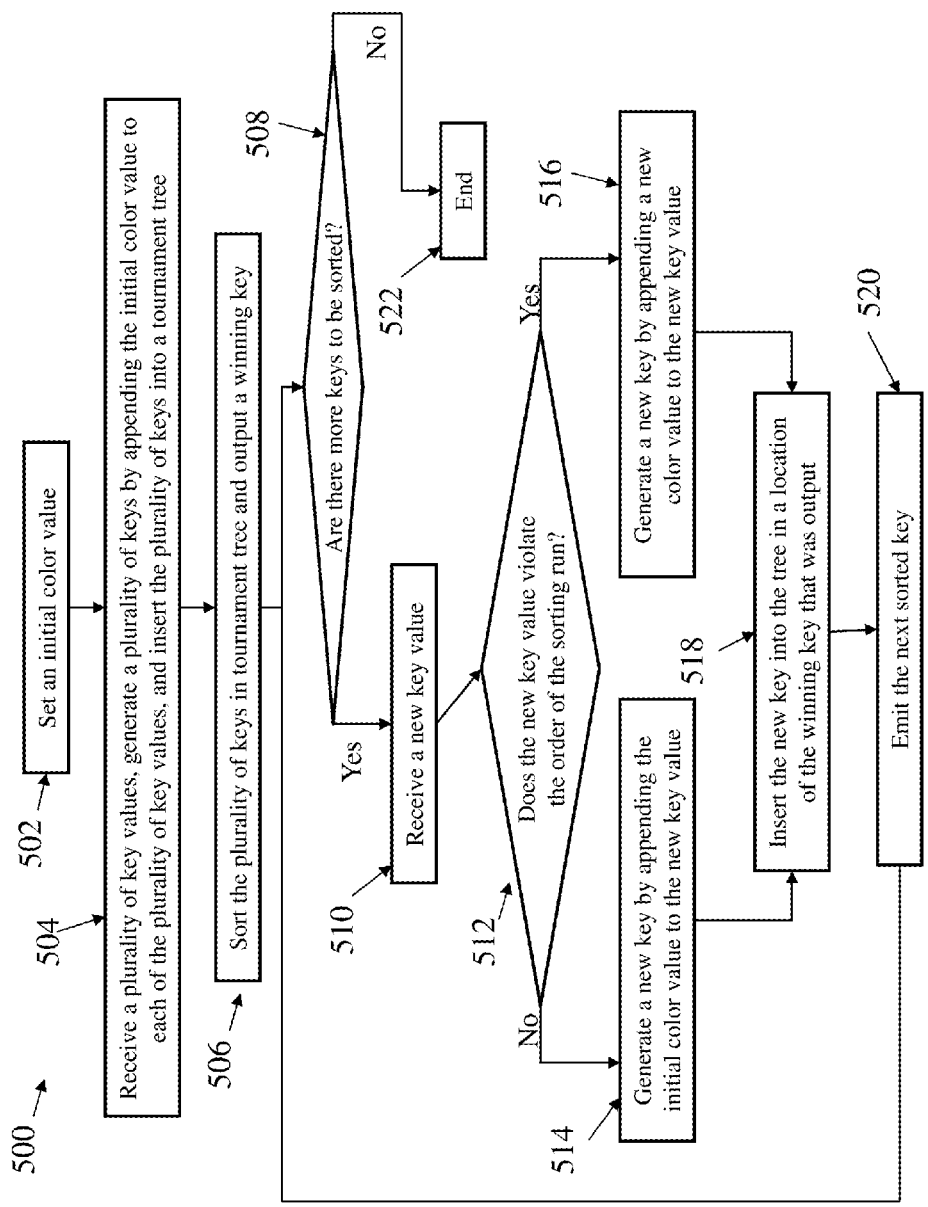
FIG. 5 depicts a flow diagram of a method for performing multiple tournament tree sorting runs with keys having a color value according to an embodiment.

Referring now to FIG. 5, a flow diagram illustrating a method 500 for performing multiple tournament tree sorting runs with keys having a color value according to an embodiment is shown. As illustrated at block 502, the method 500 includes setting an initial color value. Next, as shown at block 504, the method 500 includes receiving a plurality of key values, generating a plurality of keys by appending the initial color value to each of the plurality of key values and inserting the plurality of keys into the tree. The method 500 then includes sorting the plurality of keys in tree and outputting a winning key, as shown at block 506. Next, as shown at decision block 508, the method 500 includes determining if there are more keys to be sorted. If there are not more keys to be sorted, the method 500 proceeds to block 522 and concludes.

If there are more keys to be sorted, the method 500 includes receiving a new key value, as shown at block 510. At decision block 512, the method 500 includes comparing the new key value to the key value of the winning key to determine if the new key value would violate the order of the sorting run. If the new key would not violate the order of the sorting run, the method 500 proceeds to block 514 and generates a new key by appending the initial, or current, color value to the new key value. Otherwise, the method 500 proceeds to block 516 and generates a new key by appending a new color value to the new key value. The method 500, the proceeds to block 518 and inserts the new key into the tree in a location of the winning key that was output. Next, as shown at block 520, the method 500 includes outputting the next sorted key. In exemplary embodiments, the method 500 includes sorting of the tree after the new key is inserted. In exemplary embodiments, the method 500 is executed by an accelerator such as a FPGA or the like.

In exemplary embodiments, as the plurality of keys are received by a hardware device each of the plurality of keys are stored in a random access memory located on the hardware device. In exemplary embodiments, the location of the key in the random access memory corresponds to a location of a leaf node of a tournament tree. In exemplary embodiments, the as the tournament tree is populated with incoming keys, pair-wise comparison of the incoming keys is performed and a first array of pointers to the leaf nods is created. The first array of pointers is created based on the outcome of the pair-wise comparison of the plurality of keys in the tournament tree In exemplary embodiments, the number of keys in the tournament tree may be N keys and sorting the plurality of keys in tournament tree includes performing pair-wise speculative comparison of two of the plurality of keys at different levels of the tree. In exemplary embodiments, sorting the plurality of keys in tournament tree further will result in identifying and outputting subsequent winning keys from the plurality of keys in the tournament tree every log N clock cycles.

In one embodiment, the winning key corresponds to the key with a highest key value and a determination that the new key would not violate a sorted order of the tournament tree is based on the new key value being greater than the key value of the winning key. In another embodiment, the winning key corresponds to the key with a lowest key value and a determination that the new key would not violate a sorted order of the tournament tree is based on the new key value being less than the key value of the winning key.

In exemplary embodiments, both the number of keys and the size of the keys can be varied in the tournament tree sort algorithm. In exemplary embodiments, keys having a null key value may be inserted in the place of output keys to flush the tree if no more keys remain to be sorted. In exemplary embodiments, the key value may include any value that can be represented by forty bytes, three hundred and twenty bits, or less.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of performing a tournament tree sort on a hardware accelerator, comprising:
   receiving a plurality of key values by the hardware accelerator;
   storing each the plurality of keys into a location on a memory of the hardware accelerator;
   creating a pointer to each of the locations of the plurality of keys;
   storing the pointer to each of the plurality of keys into a first array stored by the hardware accelerator;
   sorting the plurality of keys by ordering the pointers in the first array wherein the sorting includes performing a pairwise comparison of the key values associated the pointers having adjacent initial positions in the first array and storing the pointers of the loser of the pairwise comparison in a second array, wherein a size of the second array is one quarter of a size of the first array to prevent corrupting the pointers to the plurality of keys being sorted and wherein the sorting identifies a winning key from the plurality of keys in the memory; and
   outputting the winning key.

2. The method of claim 1, wherein the hardware accelerator is a field programmable gate array (FPGA) or an application-specific integrated circuit (ASIC).

3. The method of claim 1, wherein sorting the plurality of keys includes performing a speculative comparison of two of the plurality of keys.

4. The method of claim 3, wherein the plurality of keys includes N keys and wherein the sorting identifies a subsequent winning key from the plurality of keys after every log N clock cycles.

5. The method of claim 1, wherein the winning key corresponds to the key with a highest key value.

6. The method of claim 1, wherein the winning key corresponds to the key with a lowest key value.

7. The method of claim 1, wherein storing the pointer to each of the plurality of keys into the first array on the hardware accelerator includes determining a location in the first array based on the key value.

8. The method of claim 1, wherein ordering the pointers in the first array includes performing comparisons of the key values associated with adjacent pointers in the first array.

9. A method of performing a tournament tree sort on a hardware accelerator, comprising:
   receiving a plurality of key values by the hardware accelerator;
   storing each the plurality of keys into a location on a memory of the hardware accelerator;
   creating a pointer to each of the locations of the plurality of keys;
   storing the pointer to each of the plurality of keys into an initial position a first array stored by the hardware accelerator, wherein the initial position of each of the plurality of keys is determined based on a pairwise comparisons of the key values associated with adjacent locations in the memory of the hardware accelerator;
   sorting the plurality of keys by performing a pairwise comparison of the key values associated the pointers having adjacent initial positions in the first array and by storing the pointers of the loser of the pairwise comparison in a second array, wherein a size of the second array is one quarter of a size of the first array to prevent corrupting the pointers to the plurality of keys being sorted and wherein the sorting identifies a winning key from the plurality of keys in the memory; and
   outputting the winning key.

10. The method of claim 9, wherein the hardware accelerator is a field programmable gate array (FPGA) or an application-specific integrated circuit (ASIC).

11. The method of claim 9, wherein sorting the plurality of keys includes performing a speculative comparison of two of the plurality of keys.

12. The method of claim 11, wherein the plurality of keys includes N keys and wherein the sorting identifies a subsequent winning key from the plurality of keys after every log N clock cycles.

13. The method of claim 9, wherein the winning key corresponds to the key with a highest key value.

14. The method of claim 9, wherein the winning key corresponds to the key with a lowest key value.

15. The method of claim 9, wherein storing the pointer to each of the plurality of keys into the first array on the hardware accelerator includes determining a location in the first array based on the key value.

16. The method of claim 9, wherein reordering the pointers in the first array includes storing a winner of the pairwise comparison of the key values associated the pointers having adjacent initial positions in the first array in the second array.

* * * * *